(12) United States Patent
Satoh

(10) Patent No.: US 6,710,806 B1
(45) Date of Patent: Mar. 23, 2004

(54) AUTOMATICALLY FOCUSING SYSTEM AND FOCUSING METHOD THEREFOR

(75) Inventor: Masaki Satoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 776 days.

(21) Appl. No.: 09/640,979

(22) Filed: Aug. 17, 2000

(30) Foreign Application Priority Data

Aug. 19, 1999 (JP) .......................................... 11-233202

(51) Int. Cl.⁷ .......................... H04N 5/232; H04N 9/07
(52) U.S. Cl. ...................... 348/350; 348/337; 348/351
(58) Field of Search ................................ 348/272, 273, 348/280, 335, 336, 337, 340, 345, 347–351, 354–356, 362; 396/121, 122, 123, 138, 139; 382/254, 255, 276, 280; H04N 9/07, 5/232

(56) References Cited

U.S. PATENT DOCUMENTS 5,559,321 A * 9/1996 Kusaka ..................... 250/201.8
5,570,433 A * 10/1996 Nagamine et al. .......... 382/255
6,154,574 A * 11/2000 Paik et al. .................. 382/255

FOREIGN PATENT DOCUMENTS

JP          7-084177          3/1995

* cited by examiner

Primary Examiner—Ngoc-Yen Vu
(74) Attorney, Agent, or Firm—Oblon, Spivak, McClelland, Maier & Neustadt, P.C.

(57) ABSTRACT

An automatically focusing system comprises a distance-direction calculating section for calculating defocusing characteristic information of the picture image data in the respective AF areas of the black and white image sensors, which have been disposed in such that light receiving distances differ from one another in every respective colors to estimate a distance up to a focusing point as well as a direction along the same on the basis of the defocusing characteristic information of the respective colors, and a driving device for focal point adjustment for judging whether or not a situation is in a focusing condition based on the distance up to the focusing point and shifting the focus lens by the distance up to the focusing point along the direction in the focusing point estimated in the case when it was judged that a situation was not in a focusing condition, whereby a high-speed focusing operation can be achieved with a simple structure.

9 Claims, 13 Drawing Sheets

LIGHT RECEIVING POSITION IN CASE OF PHOTOGRAPHING

LIGHT RECEIVING POSITION IN CASE OF AF OPERATION window.dat
scale = 1.000000

TWO-DIMENSIONAL HAMMING WINDOW FUNCTION psf_09.dat
scale = 1858.404226

POINT IMAGE DISTRIBUTION FACTOR IN CASE OF
FOCUSING CONDITION

POINT IMAGE DISTRIBUTION FACTOR IN CASE OF
DEFOCUSING CONDITION

FIG.14

EXPLANATORY DIAGRAM OF FOCAL DISTANCE L
IN CASE OF FORWARD FOCUSING CONDITION

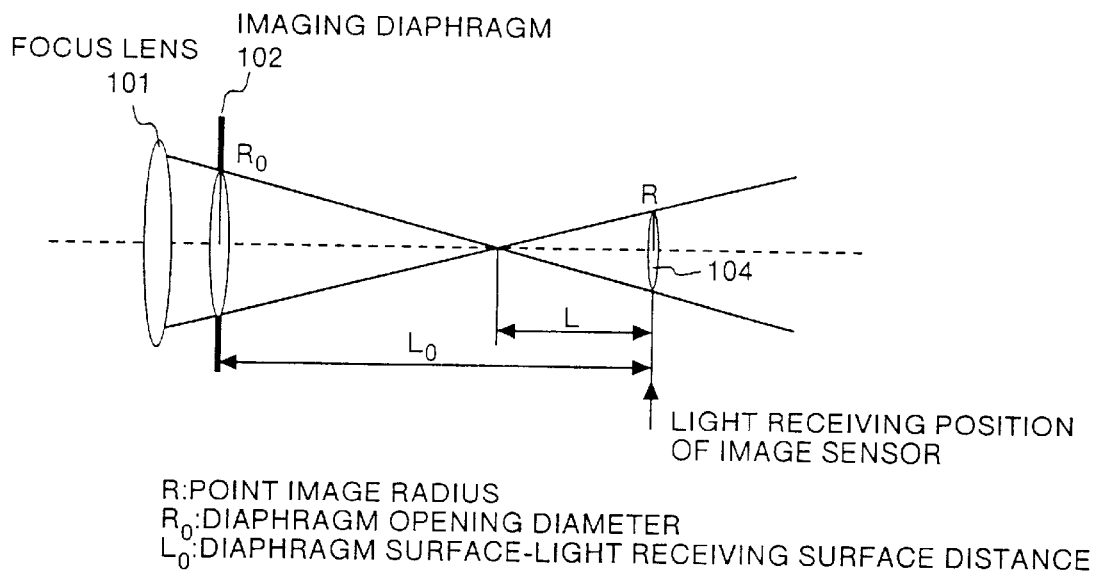

R: POINT IMAGE RADIUS
$R_0$: DIAPHRAGM OPENING DIAMETER
$L_0$: DIAPHRAGM SURFACE-LIGHT RECEIVING SURFACE DISTANCE

FIG.15

EXPLANATORY DIAGRAM OF FOCAL DISTANCE L
IN CASE OF REARWARD FOCUSING CONDITION

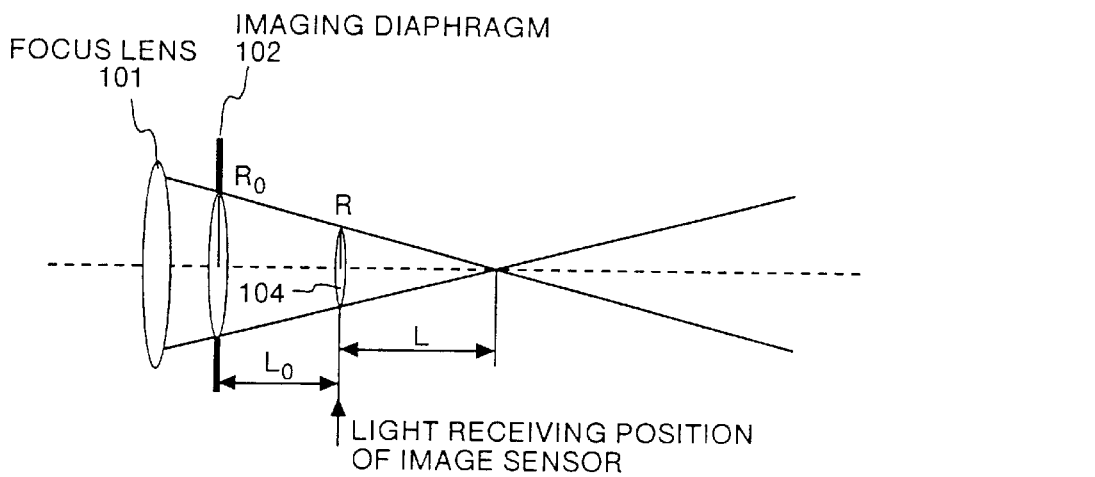

R: POINT IMAGE RADIUS
$R_0$: DIAPHRAGM OPENING DIAMETER
$L_0$: DIAPHRAGM SURFACE-LIGHT RECEIVING SURFACE DISTANCE

AUTOMATICALLY FOCUSING SYSTEM AND FOCUSING METHOD THEREFOR

FIELD OF THE INVENTION

The present invention relates to an automatically focusing system and the focusing method therefor, and more particularly to an automatically focusing system and the focusing method therefor which are to be applied to picture image inputting equipment such as video camera, and digital still camera wherein an imaging device is used.

BACKGROUND OF THE INVENTION

In recent years, reduction in the number of parts to be used becomes an important problem as a result of request for low cost with progress in a serious situation in digital still camera market. Under the circumstances, one of major parts in digital still camera is microprocessor (including DSP). In this respect, while a microprocessor of late date has a low price, it exhibits performance superior to that required for functioning as a controller of a digital still camera. For this reason, there is a tendency wherein, for example, function in a part of distance measuring module (AF sensor) in silver halide camera is replaced by imaging system+digital signal processing in digital still camera. As focusing manners in digital still camera, there are major manners of "explanatory methods" and "correlation". In this connection, both the "explanatory method" and "correlation" manners will be described hereinafter.

In a focusing method according to "explanatory method" manner known in general, although an AF evaluated value (calculated from a high frequency component of a picture image) at a position where the picture image has been taken into a camera can be obtained. It is difficult to detect such a fact that where is a focusing point in either direction of before or after the intake position of the picture image as well as such a fact that where is a focusing point with how much magnitude of a distance. For this reason, AF evaluated values ranging over the whole area where lens transfers are required in order to detect the focusing point with avoidance of the maximal point. Accordingly, there is such a problem that the number of times for photographing an amount corresponding to the whole area becomes necessary, and an operation for returning a resulting value up to a position of the focusing point is added thereto, so that a certain time is required for obtaining a correct focusing position.

As to "correlation manner", there are autocorrelation manner and cross-correlation manner. First, in a focusing method according to autocorrelation manner, luminous flux of two or more different patterns are taken into one frame. Focus information can be obtained from picture images which have been taken into a camera an amount of which corresponds to that of one frame, while it results in a very high peak value at a position of origin (focusing point) of autocorrelation coefficient, since the correlation is derived from the same data. Consequently, since AF information submerges due to the peak value in the vicinity of a focusing point, it becomes difficult to detect such focusing point in the vicinity thereof. Thus, there is such a problem that a focusing point must be detected in accordance with another manner in the vicinity of focusing point.

On the other hand, respective AF areas are imaged with respect to luminous flux of two different patterns in a focusing method according to cross-correlation manner, but it is required to prepare two image memories, while no very high peak value is obtained at a position of origin as in autocorrelation manner. From the fact described hereinbefore, focus information can be obtained over a range extending from the vicinity of focusing point to a position away therefrom without being submerged by such peak value. In cross-correlation manner, however, luminous flux of two different patterns must be prepared by means of an AF diaphragm plate in order to obtain focus information, so that there is such a problem that the AF diaphragm plate becomes unnecessary at the time of taking photograph. In addition, there is also such a problem that a size of opening is fixed in AF diaphragm plate and as a result, it is difficult to optimize quantity of light which has been received by an image sensor.

Furthermore, a method for detecting a focusing point by utilizing chromatic aberration of an object in a video camera of a multiple plate type has been also proposed. For instance, "an image pickup apparatus" described in Japanese Patent Application Laid-Open (JP-A) No. 07-084177 is the image pickup apparatus wherein luminous flux from photographing lenses is decomposed into light of the plurality of colors through an optical system for color decomposition, and then an object image based on the light of respective colors is introduced to corresponding image pickup means, respectively, characterized by that one of the plurality of image pickup means is used as a reference image pickup means at least a part of the photographing lenses is driven in such that the object image is focused to the reference image pickup means, and thereafter signals from the image pickup means other than the reference image pickup means are allowed to input to a focus detecting means, whereby a position on optical axis is established by utilizing the signals from the focus detecting means.

In the "image pickup apparatus" described in the above Japanese Patent Application Laid-Open (JP-A) No. 07-084177, however, since a distance up to focusing point has not been detected, very often image pickup operations are required for obtaining the focusing point until it is achieved, and thus, there is such a problem that a certain time is required for attaining a pertinent position of the focusing point as in the above-mentioned "explanatory methods" manner.

SUMMARY OF THE INVENTION

It is an object of the present invention to provide an automatically focusing system wherein an imaging device of a multiple plate type is used, characterized by having a simple construction and by which high-speed focusing operation becomes possible as well as to provide the focusing method therefor.

In order to solve the above described problems, the invention according to a first aspect relates to an automatically focusing system provided with an imaging device of a multiple plate type, comprising a lens system for subjecting object light ray to chromatic aberration correction to image the resulting light ray; a color decomposing means for separating the object light ray through the lens system into respective color components; a plurality of imaging devices in each of which an AF area is established in a central part of an imaging area and which is served for receiving the color component to convert the same into picture image data; a focusing position estimating means for calculating defocusing characteristic information of the picture image data in the respective AF areas of the plurality of imaging devices which have been disposed in such that light receiving distances differ from one another in every respective colors to estimate a distance up to a focusing point as well as a direction along the same on the basis of the defocusing characteristic information of the calculated respective colors; a focusing condition discriminating means for judging whether or not a situation is in a focusing condition based on the distance up to the focusing point estimated by the focusing position estimating means; and a driving means for shifting the lens system or the color decomposing means by the distance up to the focusing point along the direction in the focusing point estimated by the focusing position estimating means in the case when it was judged that a situation was not in a focusing condition by means of the focusing condition discriminating means.

Furthermore, the invention according to a second aspect relates to an automatically focusing system provided with imaging devices of a multiple plate type, comprising a lens system for subjecting object light ray to chromatic aberration correction to image the resulting light ray; a color decomposing means for separating the object light ray through the lens system into respective color components; a plurality of imaging devices in each of which an AF area is established in a central part of an imaging area and which is served for receiving the color component to convert the same into picture image data; an imaging device shifting means for shifting the imaging devices; a focusing position estimating means for calculating defocusing characteristic information of the picture image data in the respective AF areas of the plurality of imaging devices which have been shifted by the imaging device shifting means in such that light receiving distances differ from one another in every respective colors and calculating point image radii in the respective colors on the basis of point image distribution factors of the respective colors calculated to estimate a distance up to a focusing point as well as a direction along the same based on the point image radii of the calculated respective colors; a focusing condition discriminating means for judging whether or not a situation is in a focusing condition based on the distance up to the focusing point estimated by the focusing position estimating means; and a driving means for shifting the lens system or the color decomposing means by the distance up to the focusing point along the direction in the focusing point estimated by the focusing position estimating means in the case when it was judged that a situation was not in a focusing condition by means of the focusing condition discriminating means.

Furthermore, the invention according to a third aspect relates to an automatically focusing system in the first or second aspect, wherein the focusing position estimating means multiplies the picture image data in the AF area by window function, then subjects the result to two-dimensional Fourier transform to transform the result into an amplitude and a phase in a frequency region thereby to replace respective phases in the whole frequency region with zero, and thereafter subjects the result to two-dimensional inverse Fourier transform to calculate the point image distribution factor.

Moreover, the invention according to a fourth aspect relates to an automatically focusing system in the second or third aspect, wherein the focusing position estimating means calculates a sectional area based on a threshold value calculated on the basis of a peak value of its origin of the point image distribution factor, and the point image radius is calculated on the basis of the calculated sectional area.

Furthermore, the invention according to a fifth aspect relates to a focusing method for an automatically focusing system, comprising a first step for disposing a plurality of imaging devices in such that respective light receiving distances differ from one another; a second step for subjecting object light ray to chromatic aberration correction by means of a lens system to image the resulting light ray; a third step for separating the object light ray through the lens system into respective color components; a fourth step for estimating a distance up to a focusing point as well as a direction along the same on the basis of point image distribution radii in respective colors calculated wherein light rays in respective color components are received by the plurality of imaging devices, point image distribution factors indicating defocusing characteristics in every respective colors of the picture image data in the respective AF areas are calculated respectively, and the point image radii of the respective colors are calculated on the basis of the calculated point image distribution factors in the respective colors; a fifth step for judging whether or not a situation is in a focusing condition based on the estimated distance up to the focusing point; a sixth step for shifting the lens system or the color decomposing means by the distance up to the focusing point along the direction in the focusing point estimated in the case when it was judged that a situation was not in a focusing condition in the fifth step; a seventh step for repeating the second step through the fifth step after shifting the lens system or the color decomposing means by the distance up to the focusing point along the direction in the focusing point estimated; and an eighth step for performing normal photographing operation after shifting the plurality of imaging devices to positions wherein the respective distances for receiving light rays are identical with each other in the case when it was judged that a situation was in a focusing condition in the fifth step.

Moreover, the invention according to a sixth aspect relates to a focusing method for an automatically focusing system in the fifth aspect, wherein in the fourth step, the picture image data in the AF area is multiplied by window function, then the result is subjected to two-dimensional Fourier transform to transform into an amplitude and a phase in a frequency region, the respective phases in the whole frequency region are replaced by zero, and thereafter, the result is subjected to two-dimensional inverse Fourier transform to calculate the point image distribution factor.

Furthermore, the invention according to a seventh aspect relates to a focusing method for an automatically focusing system in the fifth or sixth aspect, wherein in the fourth step, a sectional area is calculated on the basis of a threshold value calculated based on a peak value in its origin of the point image distribution factor, and the point image radii are calculated on the basis of the calculated sectional area.

Other objects and features of this invention will become understood from the following description with reference to the accompanying drawings.

BRIEF DESCRIPTION OF THE DRAWINGS

FIG. 14 is an explanatory diagram for explaining a focal length L in case of forward focusing condition; and FIG. 15 is an explanatory diagram for explaining a focal length L in case of rearward focusing condition.

DESCRIPTION OF THE PREFERRED EMBODIMENTS

Preferred embodiments wherein an automatically focusing system according to the present invention has been applied to a digital still camera will be described in detail hereinafter ;by referring to the accompanying drawings.

Figure 1:
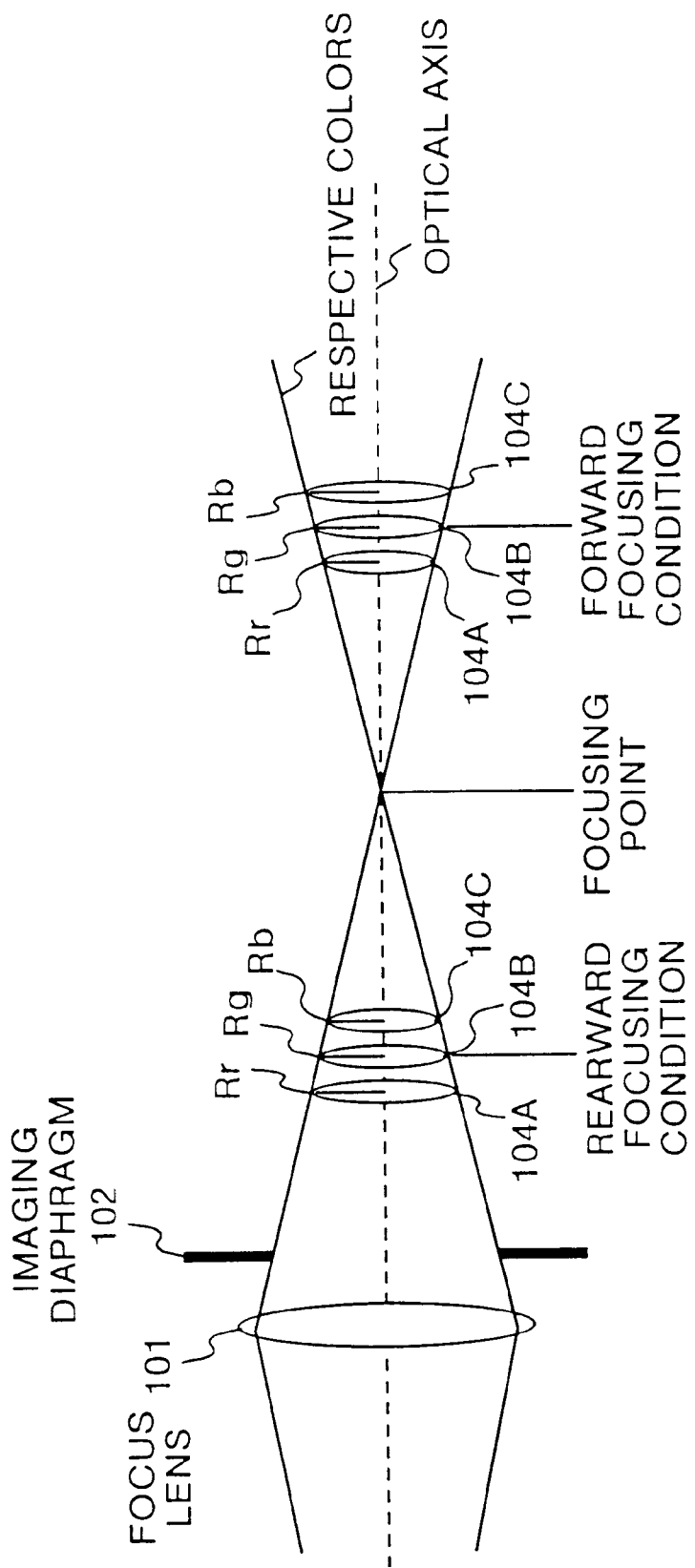
FIG. 1 is an explanatory diagram for explaining the principle of the present invention.
Figure 2:
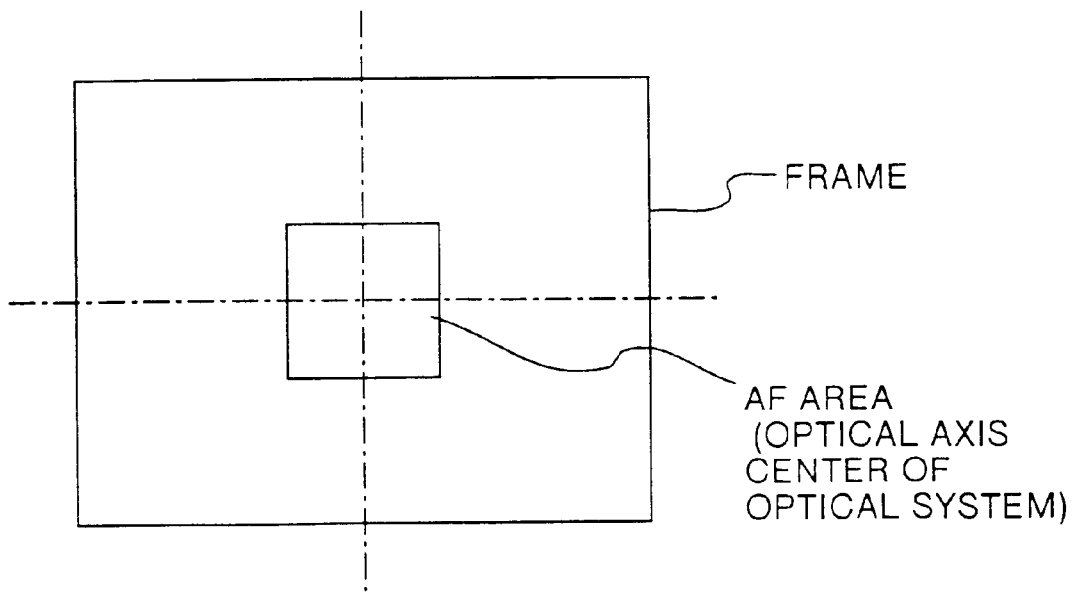
FIG. 2 is an explanatory diagram for explaining an AF area of black and white image sensors.
Figure 3:
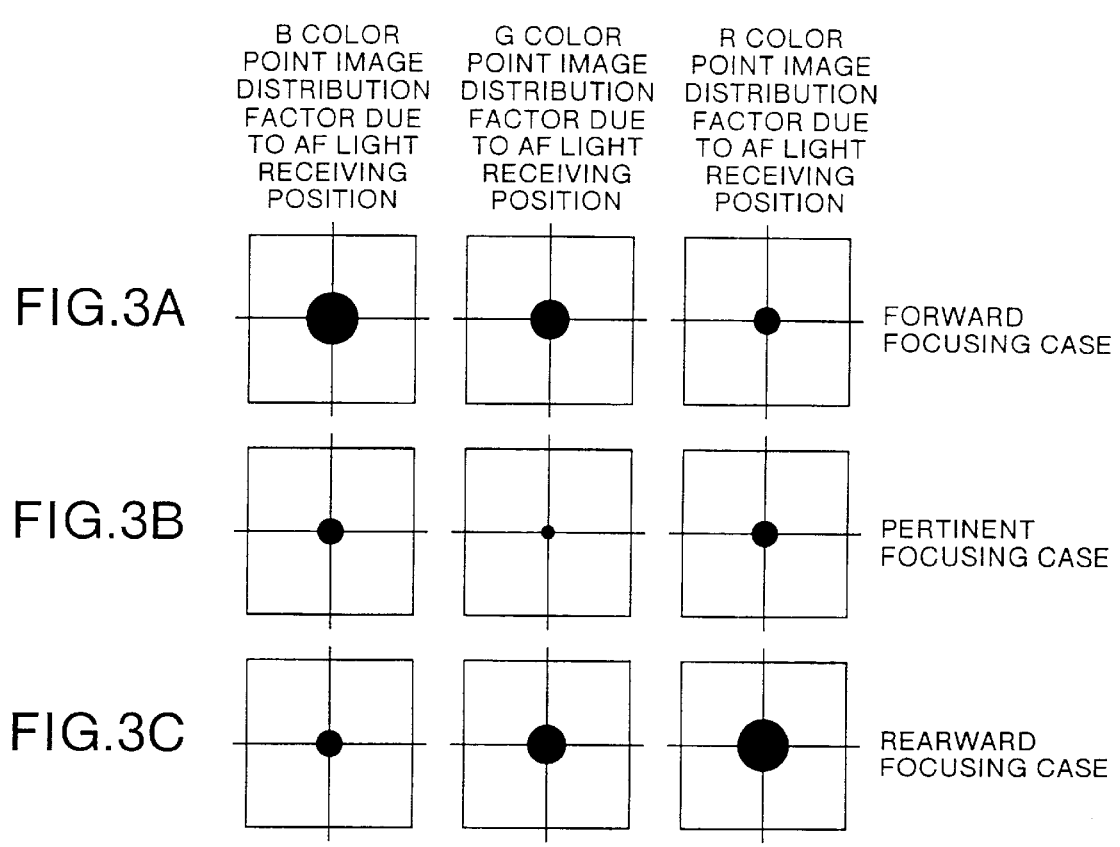
FIGS. 3A to 3C are explanatory diagrams for each explaining a manner for determining a direction and a distance of a focal point.
Figure 4:
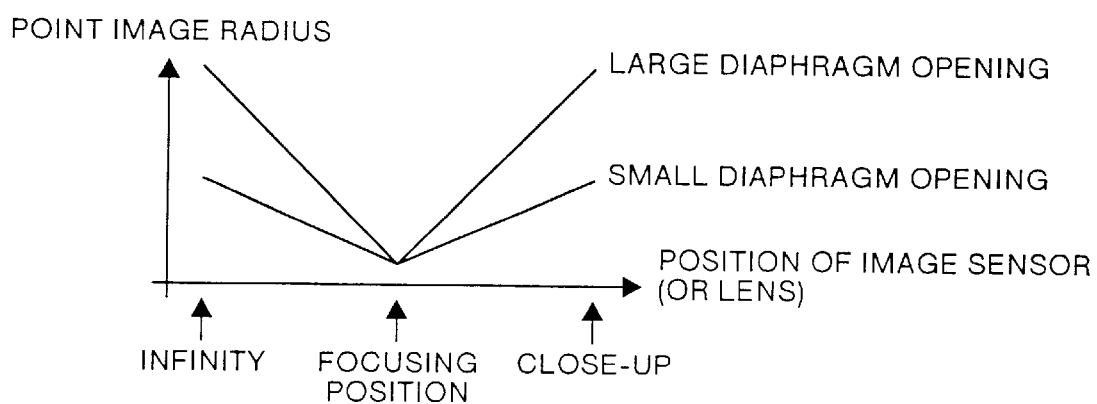
FIG. 4 is a diagram for explaining a relationship between a point image radius and a diaphragm opening diameter.

First, principle of the present invention will be described by referring to FIGS. 1 to 4 wherein FIG. 1 is an explanatory diagram for explaining the principle of the present invention; FIG. 2 is an explanatory diagram for explaining an AF area of a color image sensor; FIGS. 3A, 3B and 3C are explanatory diagrams for each explaining a manner for determining a direction and a distance of a focal point; and FIG. 4 is a diagram for explaining a relationship between a point image radius and a diaphragm opening diameter.

In FIG. 1, reference numeral 101 designates a focus lens, 102 an imaging diaphragm, 104A, 104B, 104C black and white image sensors for receiving R light ray, G light ray and B light ray, respectively, being input through a color decomposing prism (not-shown) (see FIG. 5), Rr a point image radius of R color, Rg a point image radius of G color, and Rb a point image radius of B color, respectively. In the same figure, optical paths of R, G, and B light rays are represented wherein a case where the black and white image sensor 104 is positioned at a position where it is in rearward focusing condition as well as a case where the black and white image sensor 104 is positioned at a position where it is in forward focusing condition. Incidentally, in FIG. 1, respective optical axes obtained by three color decomposition are shown as one optical axis for simple explanation. It is to be noted that an illustration of the color decomposing prism to be placed before the black and white image sensors 104A, 104B, and 104C is omitted in the same figure.

In the same figure, light ray input from the left side towards the right direction on the surface in the drawing passes through the focus lens 101, and is received by the respective black and white image sensors 104A, 104B, 104C in the form of R, G, B color light rays which have been decomposed by the color decomposing prism (not shown) after passing the same through the picture intake diaphragm 102. In this case, what is required as focus information is picture image data in an area (AF area) which is intended to be focused by a user, so that the data belonging to the whole frame is not necessary, and only the picture image data in the AF area is transferred.

FIG. 2 is a diagram showing an AF area of the black and white image sensors 104A, 104B, and 104C. As shown in the same figure, the AF area is established at the central position of an optical axis of an optical system in the frame of the black and white image sensors 104A, 104B, and 104C. According to the present invention, the black and white image sensors 104A, 104B, and 104C are arranged in such that random access of picture elements are possible therein, so that the object to be transferred becomes only the data in the AF area, whereby a time required for transfer is significantly reduced.

Thereafter, a point image distribution factor of image data in the AF area is determined in every colors with respect to R, G, B image data separated in every colors. In FIGS. 3A to 3C, one example each of a point image distribution factor of R, G, and B colors, respectively, in case of forward focusing condition is shown in FIG. 3A, the same in case of pertinent focusing condition is shown in FIG. 3B, and the same in case of rearward focusing condition is shown in FIG. 3C.

FIG. 4 is a graphical representation showing a relationship between a point image radius and a diaphragm opening diameter wherein abscissa indicates a position of black and white image sensor (or a lens position) and ordinate indicates a point image radius. As shown in the same graph, the point image radius increases with increase in the diaphragm opening diameter, and the point image radius becomes minimum at the focusing position. In this case, a size of the point image radius is affected in proportional to a degree of aperture stop.

In these circumstances, a distance up to focusing point is estimated from information of point image distribution factors of picture image data, diaphragm opening diameter, and a distance of diaphragm surface and light receiving surface in an AF area in every colors as well as a point image radius Rg of G color picture image, while a direction along a focusing point (forward focusing or rearward focusing condition) is estimated from a magnitude of three point image radii of the R, G, and B color picture images. The example of FIG. 4 indicates a case where a position of focal point of the G color picture image is selected as a target focal point distance.

Figure 5:
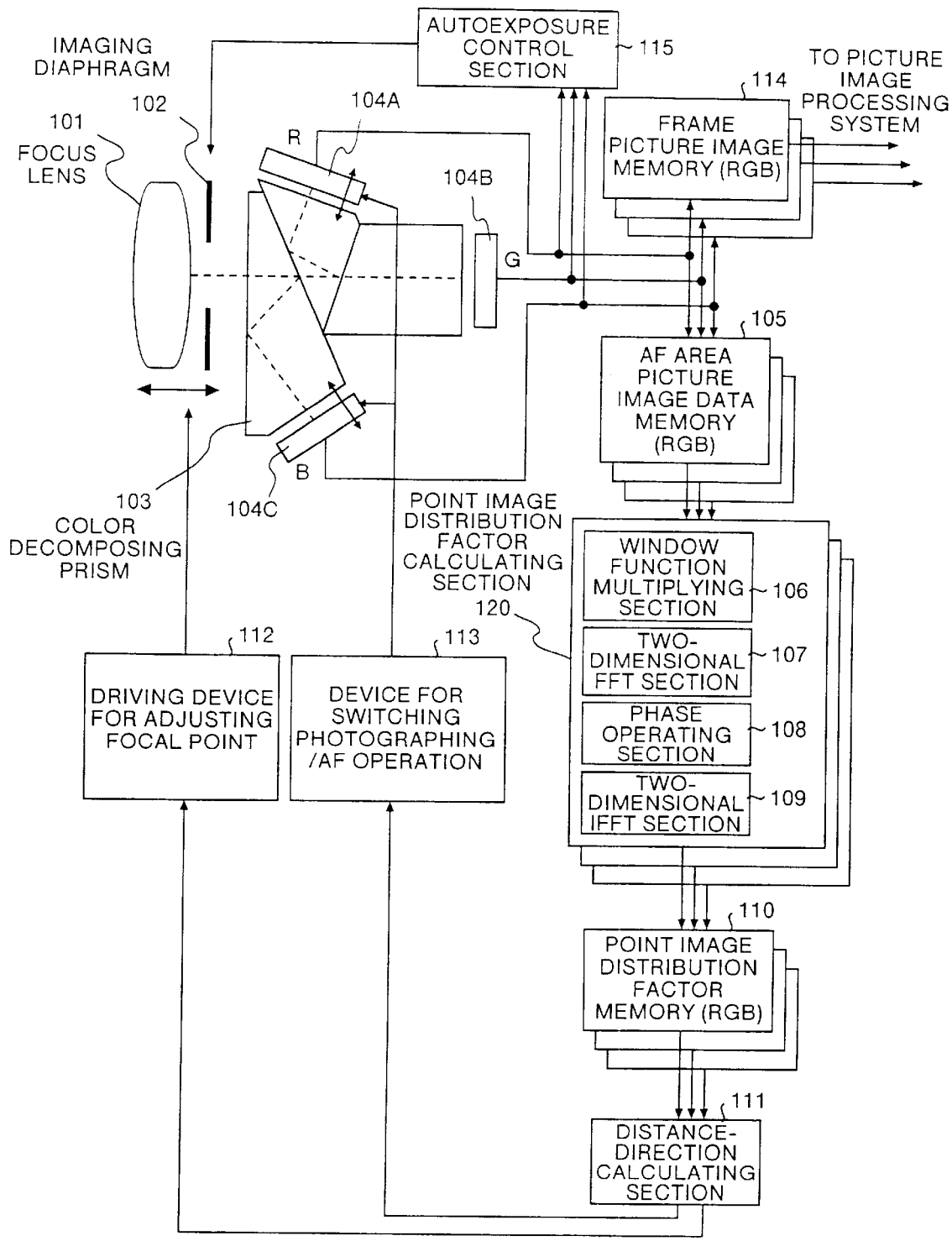
FIG. 5 is a structural diagram showing an AF processing system of a digital still camera according to the present invention.

In the following, preferred embodiments of the present invention will be described in conjunction with FIGS. 5 to 15 wherein FIG. 5 is a constitutional diagram showing a system for AF processing of a digital still camera according to the present invention. In the same figure, reference numeral 101 designates a focus lens which is the one for subjecting object light of an object to be focused to chromatic aberration correction to image the object. Reference numeral 102 denotes an imaging diaphragm which is disposed on the rear side of the focus lens 101 and served for restricting luminous flux (luminous energy) passing through the focus lens 101. Reference numeral 103 designates a color decomposing prism for decomposing the object light ray input into R light ray, G light ray, and B light ray, and 104A to 104C black and white image sensors disposed in R, G, and B sections of the color decomposing prism 103, respectively. An image of the object to be imaged is converted by these image sensors into electric signals to be output as picture image data. In these black and white image sensors 104A to 104C, random access of picture element is possible, so that picture image data in an arbitrary area in picture image frame is transferable. An imaging optical system is composed of the focus lens 101, imaging diaphragm 102, the color decomposing prism 103, and the black and white image sensors 104A to 104C. Reference numeral 115 denotes an autoexposure control section for regulating the diaphragm of the imaging diaphragm 102 to control autoexposure.

Reference numeral 105 designates an AF area picture image data memory for storing picture image data (R, G, B data) of the AF area in the respective picture image frames imaged for picking up an image in the AF, and 120 a point image distribution factor calculating section for calculating a point image distribution factor of the picture image data stored in the AF area picture image data memory 105, respectively. The point image distribution factor calculating section 120 is provided with a window function multiplying section 106 for multiplying the picture image data stored in the AF area picture image data memory 105 by a two-dimensional window function, a two-dimensional FFT section 107 for subjecting the picture image data multiplied by the two-dimensional window function in the window function multiplying section 120 to two-dimensional Fourier transform, a phase operating section 108 for effecting phase operation of the data which is subjected to Fourier transform in the two-dimensional FFT section 107, and a two-dimensional IFFT section 109 for calculating a point image distribution factor by subjecting the data which has been phase-operated in the phase operating section 108 to two-dimensional inverse Fourier transform.

Reference numeral 110 denotes a point image distribution factor memory for storing point image distribution factors in every colors calculated by the point image distribution factor calculating section 120, and 111 a distance-direction calculating section for calculating a distance up to a focusing position of the image sensor 104B for G color (reference color) as well as a direction along the same based on the point image distribution factors in every colors which have been calculated by the point image distribution factor calculating section 106, respectively.

Reference numeral 112 designates a driving device for adjusting focal point which functions to move forwards and rearwards the focus lens 101 on the basis of the operation result of the distance-direction calculating section 111, 113 a photographing/AF operation switching device for switching positions for receiving light rays in the black and white image sensors 104A and 104B in case of either AF operation, or normal photographing operation, respectively. Reference numeral 114 designates a frame picture image memory in which the picture image data an amount of which corresponds to that of one frame imaged in case of normal photographing operation is stored in every colors.

While a constitution wherein the focus lens 101 is allowed to be shifted along a direction of optical axis to adjust focal point has been described herein, it may be arranged in such that the color decomposing prism 103 is shifted forwards and rearwards in place of transferring the focus lens 101, thereby to adjust focal point. In this respect, the detailed description of such arrangement is omitted in this case.

Figure 6:
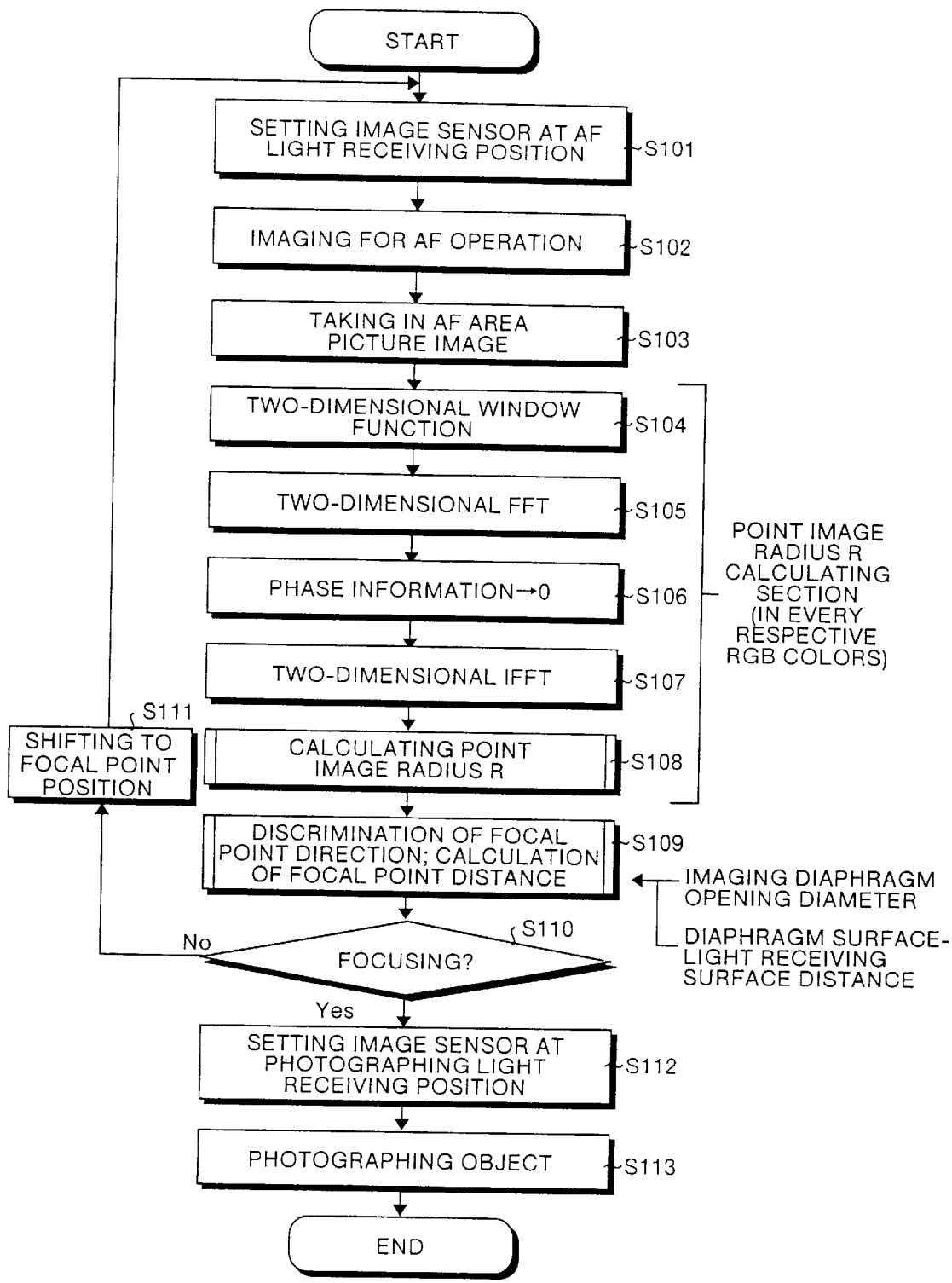
FIG. 6 is a flowchart for explaining AF operation and photographing operation of the digital still camera shown in FIG. 5.
Figure 7:
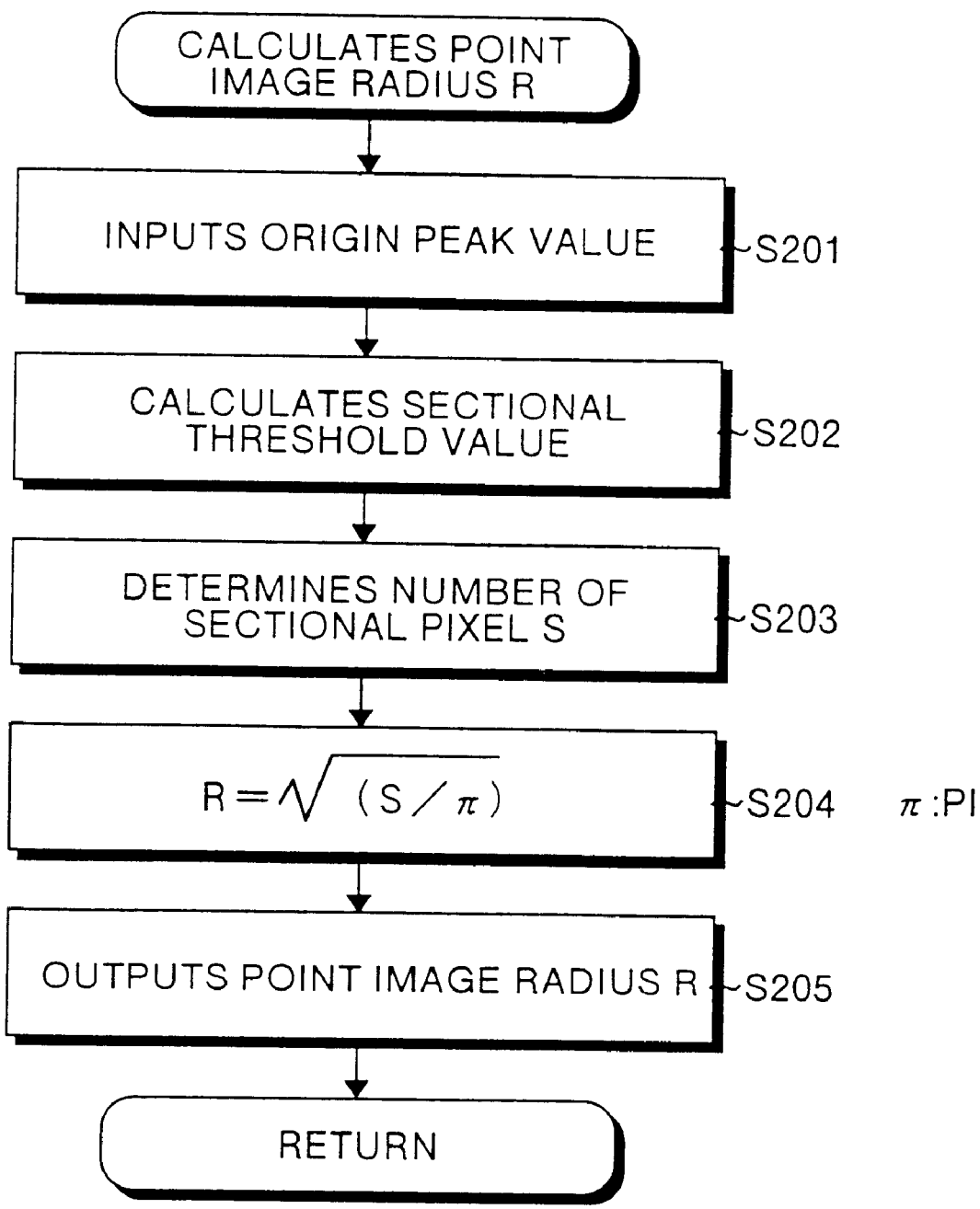
FIG. 7 is a flowchart for fully explaining processing for calculating a point image radius in the flowchart of FIG. 6.
Figure 8:
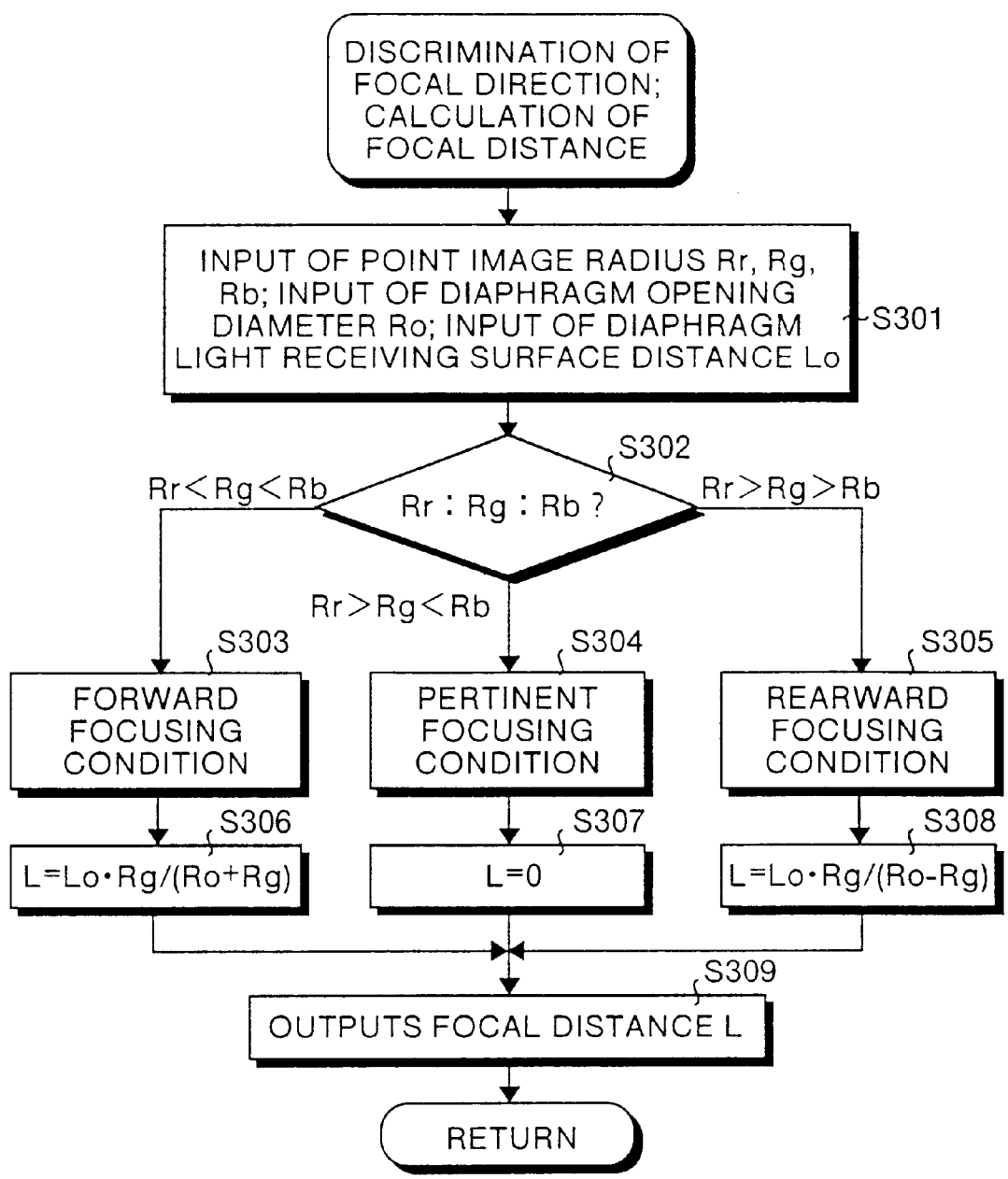
FIG. 8 is a flowchart for fully explaining processing for calculating a focal length and a focal direction in the flowchart of FIG. 6.

In the following, AF operation and photographing operation of a digital still camera shown in FIG. 5 will be described in accordance with flowcharts of FIGS. 6 to 8 by referring to FIG. 9A to FIG. 15. FIG. 6 is a flowchart for explaining AF operation as well as photographing operation; FIG. 7 is a flowchart for explaining in detail point image radius calculating processing in the AF operation of FIG. 6; and FIG. 8 is a flowchart for explaining in detail processing of calculating a distance and a direction of focal point in AF operation of FIG. 6.

Figure 9A:
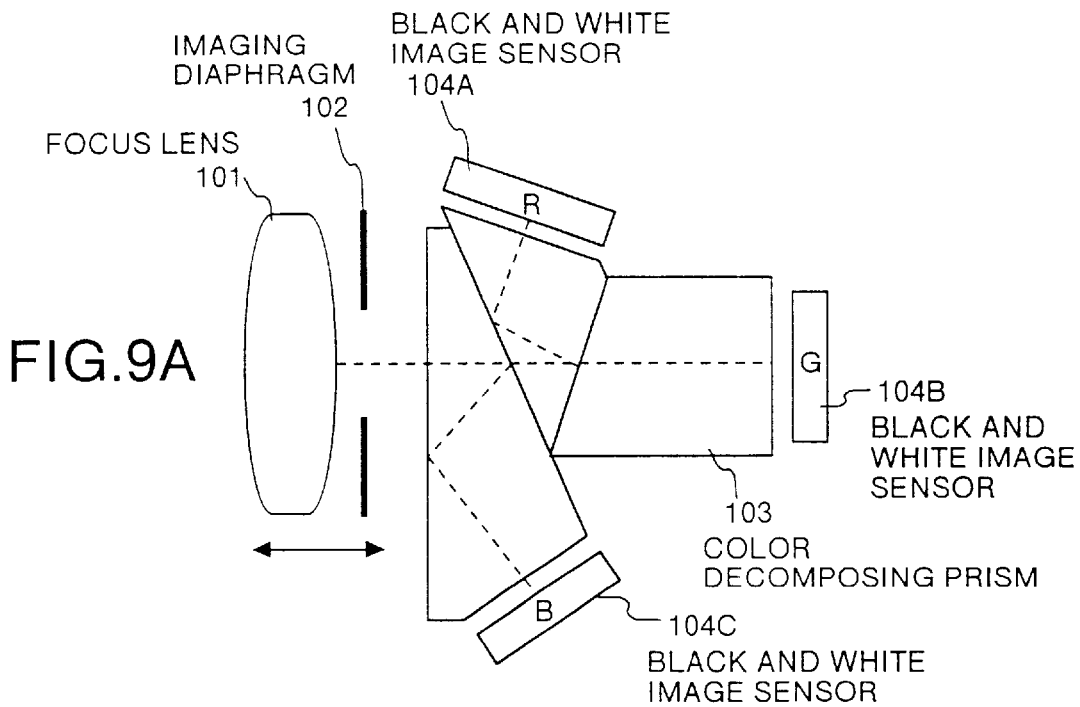
FIGS. 9A and 9B are explanatory diagrams for each explaining a layout of black and white image sensors.
Figure 9B:
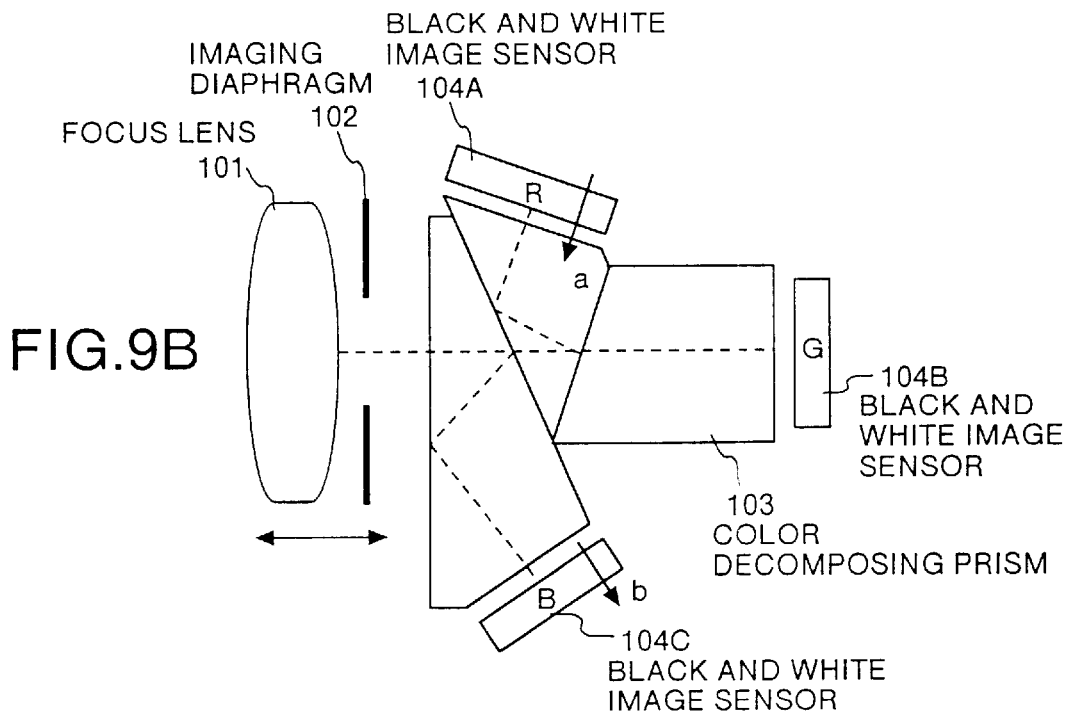
Figure 10:
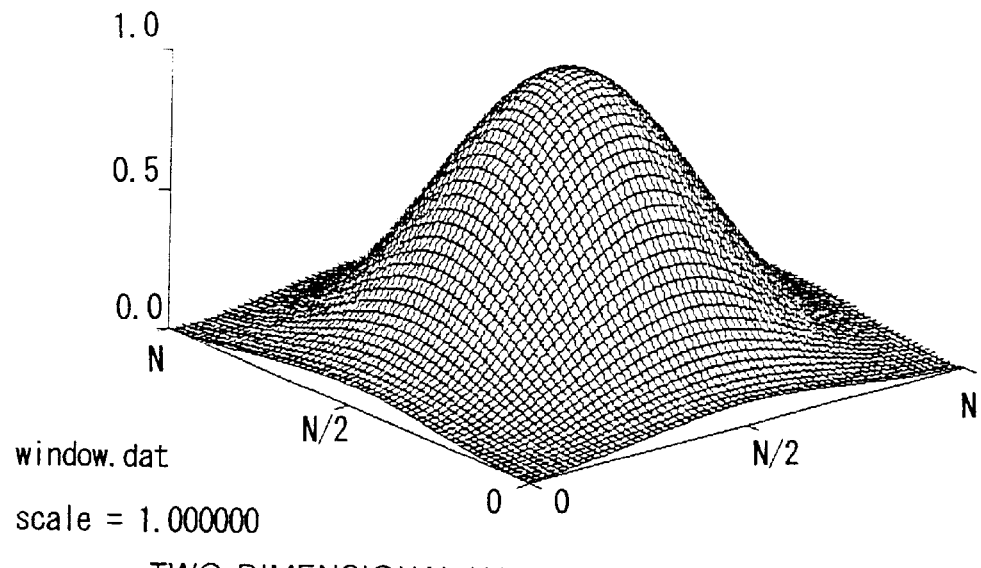
FIG. 10 is an explanatory diagram for explaining two-dimensional Hamming window function.
Figure 11:
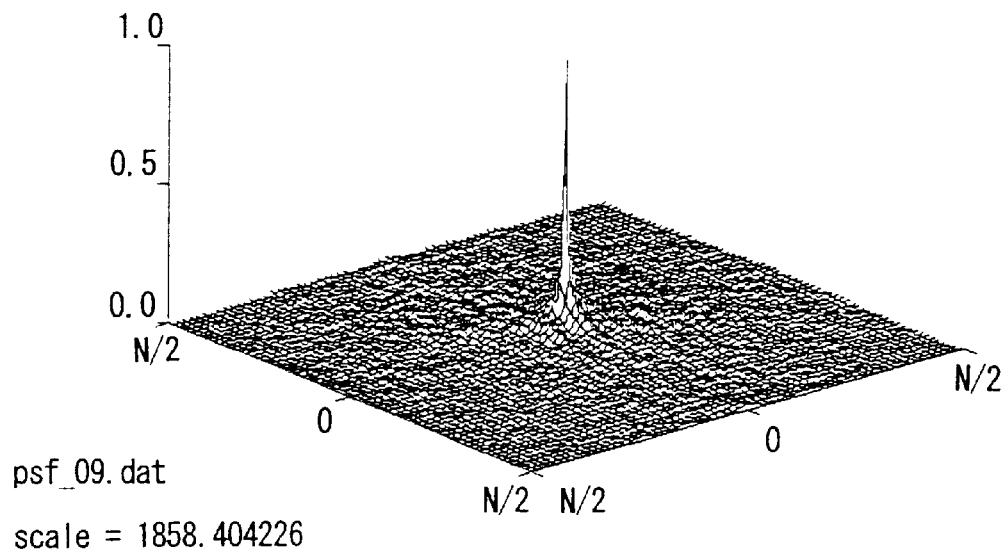
FIG. 11 is an explanatory diagram for explaining a point image distribution factor in case of pertinent focusing condition.
Figure 12:
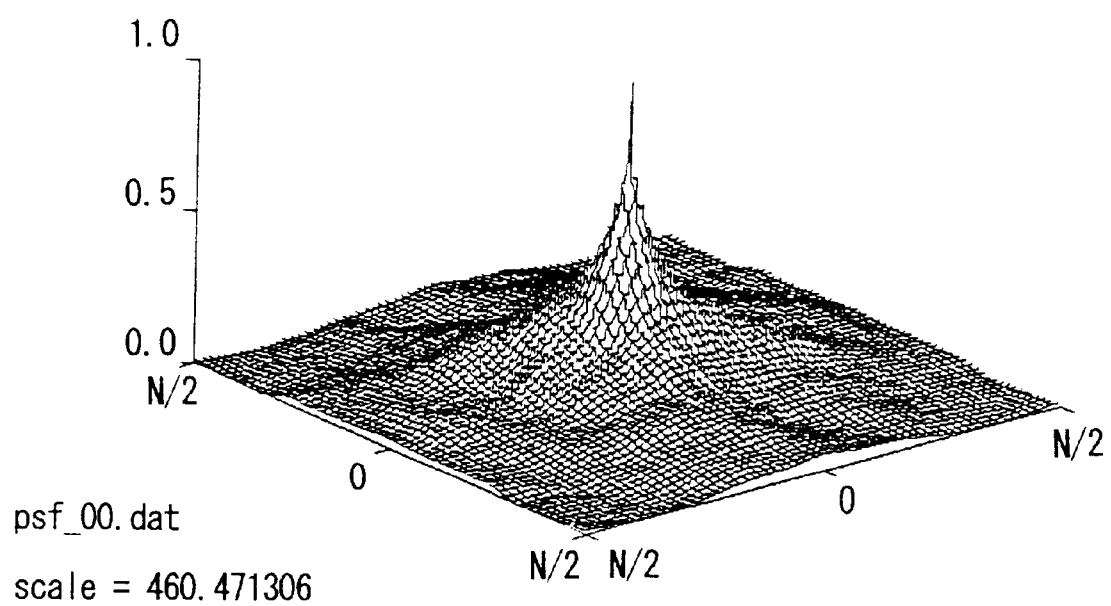
FIG. 12 is an explanatory diagram for explaining a point image distribution factor in case of defocusing condition.
Figure 13A:
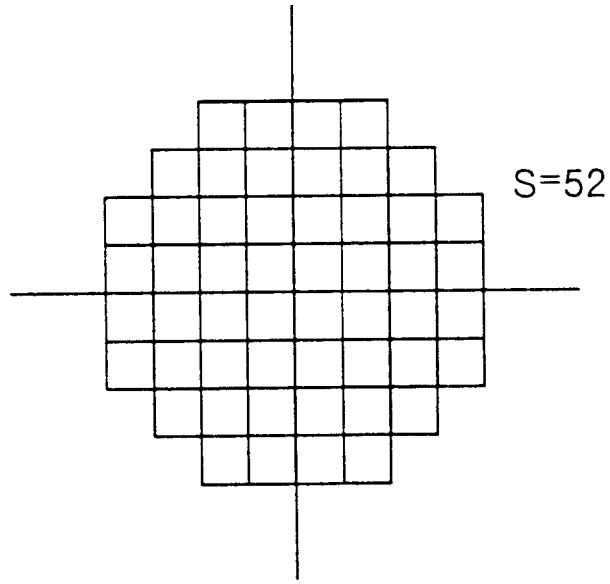
FIGS. 13A and 13B are explanatory diagrams for each explaining a manner for calculating a point image radius.
Figure 13B:
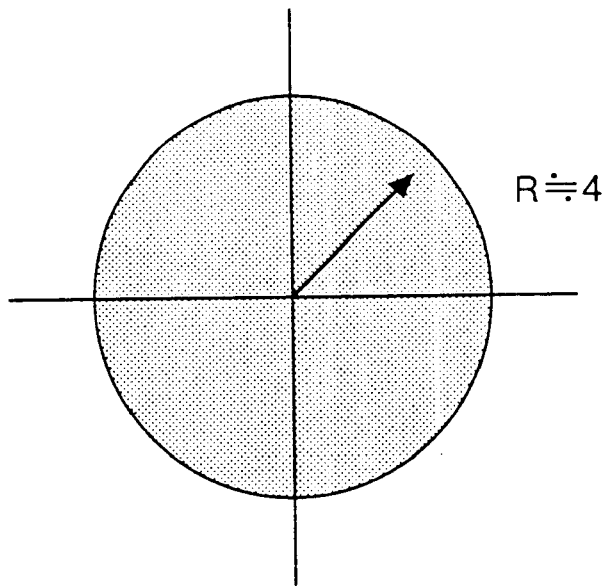

FIGS. 9A and 9B are diagrams for illustrating positions for layout of black and white image sensors wherein FIG. 9A shows a case of normal photographing operation, and FIG. 9B shows a case of AF photographing operation; FIG. 10 is a diagram for explaining two-dimensional Hamming window function; FIG. 11 is an explanatory diagram for explaining a point image distribution factor in case of pertinent focusing condition; FIG. 12 is an explanatory diagram for explaining a point image distribution factor in case of defocusing condition; FIGS. 13A and 13B are diagrams for each explaining a manner for calculating a point image radius; FIG. 14 is an explanatory diagram for explaining a focal length L in case of forward focusing condition; and FIG. 15 is an explanatory diagram for explaining a focal distance L in case of rearward focusing condition.

Referring to the flowchart of FIG. 6, when a shutter button (not shown) is pushed down halfway by means of an operation by an operator in the digital still camera shown in FIG. 5, an imaging optical system in the digital still camera functions as an AF sensor. In case of operating the AF sensor, the photographing/AF operation switching device 113 disposes the respective R color and B color black and white image sensors 104A and 104C at AF positions (step S101).

FIGS. 9A and 9B are diagrams each showing layout positions of the black and white image sensors 104A, 104B, and 104C in both cases of normal photographing operation and of AF operation wherein FIG. 9A shows layout positions of the black and white image sensors in case of normal photographing operation, and FIG. 9B shows layout positions of the black and white image sensors in case of AF operation. In case of normal photographing operation, the black and white image sensors 104A, 104B, and 104C are disposed in such that distances for receiving light ray become identical to each other in the respective black and white image sensors 104A, 104B, and 104C as shown in FIG. 9A. On the other hand, the black and white image sensors 104A, 104B, and 104C are disposed in such that distances for receiving light ray in the R color and B color black and white image sensors 104A and 104C differ from a distance for receiving light ray in the G color (reference color) black and white image sensor 104B in case of AF operation as shown in FIG. 9B. More specifically, the R color black and white image sensor 104A is allowed to be shifted in the direction of the arrow a thereby making the R color black and white image sensor 104A to be close to an R section of the color decomposing prism 103, while the B color black and white image sensor 104C is allowed to be shifted in the direction of the arrow b thereby to make the same away from the B section of the color decomposing prism 103 in case of AF operation as compared with a case of ordinary photographing operation.

Furthermore, the exposure control section 115 controls its exposure state in such that luminous energy of an object input from the outside onto the black and white image sensors 104A, 104B, and 104C is always in the optimum level using the imaging diaphragm 102 of the optical system. Imaging operation is carried out in this state for AF operation (step S102), object light ray is subjected to correction for chromatic aberration by means of the focus lens 101, the resulting light ray is decomposed by the color decomposing prism into R, G, and B components after passing through the imaging diaphragm 102, and these components of light ray decomposed are received by the black and white image sensors 104A, 104B, and 104C, respectively. Then, the respective R, G, and B picture image data in the AF area (see FIG. 2) on the black and white image sensors 104A, 104B, and 104C are transferred to the AF area picture image data memory 105, whereby the picture image data in the AF area are stored in the AF area picture image data memory 105 in every R, G, and B colors (step S103).

Then, point image radii R are calculated in every respective colors on the basis of picture image data of the respective (R, G, and B) color components which have been stored in the AF area picture image data memory 105 (steps S104 to S108). As a manner for calculating a point image radius R, the one for calculating by the use of Fourier transform will be described hereinafter.

First, in the point image distribution factor calculating section 120, point image distribution factors are calculated in every respective (R, G, and B) colors on the basis of picture image data of the respective (R, G, and B) color components which have been stored in the AF area picture image data memory 105. More specifically, in the window function multiplying section 106, picture image data fo (u, v) in AF area is multiplied by two-dimensional window function w (u, v) such as Hamming window shown in FIG. 10 as expressed in the following equation (1) in order to reduce influence of high frequency components on the boundary of picture image (step S104).

$$f(u, v) = w(u, v) \cdot fo(u, v) \tag{1}$$

where w (u, v)=w(u)·w(v)

w (u)=0.54+0.46·cos(2πu/N)

w (v)=0.54+0.46·cos(2πv/N)

N: picture image size

Then, in the two-dimensional FFT section 107, f (u, v) is subjected to two-dimensional discrete Fourier transform DFT (in reality, fast Fourier transform FFT), whereby data F (U, V) in frequency region is obtained (step S105).

The phase operating section 108 substitutes zero for respective phases of picture image data F (U, V) existing in a frequency region in the case where a point image distribution factor in the frequency region is considered to be a complex number H (U, V) for determining the H (U, V) (step S106). Namely, as shown in the following equations (2) and (3), an amplitude of F (U, V) is made to be real part of H (U, V), while imaginary part of H (U, V) is made to be zero.

$$Re\{H(U, V)\} = |F(U, V)| \tag{2}$$

$$Im\{H(U, V)\} = 0 \tag{3}$$

where $|F (U, V)| = \sqrt{[Re\{F (U, V)\}^2 + Im \{F (U, V)\}^2]}$

The two-dimensional IFFT section 109 applies two-dimensional inverse discrete Fourier transform IDFT (inverse fast Fourier transform IFFT is actually made) with respect to the result obtained, whereby a point image distribution factor h(u, v) is calculated (step S107), and point image distribution factors h(u, v) calculated in every respective (R, G, and B) colors are stored in the point image distribution factor memory 110.

Thereafter, the distance-direction calculating section 111 calculates point image radii R (a point image radius of R color is represented by Rr, that of G color is represented by Rg, and that of B color is represented by Rb) in every respective colors based on the point image distribution factors h (u, v) of the respective colors (step S108). A specific manner for calculating the point image radius R will be described hereinafter by referring to the flowchart of FIG. 7. In this respect, it is to be noted that the point image distribution factor h (u, v) exhibits the peak value at the origin. An example of point image distribution factor obtained from a focused picture image is shown in FIG. 11, while an example of point image distribution factor obtained from a defocused picture image is shown in FIG. 12. As shown in FIGS. 11 and 12, a distribution of the point image distribution function of a focused picture image exhibits an impulse contour, while a distribution of the point image distribution function of a defocused picture image exhibits a gradual conical contour in response to a degree of defocusing.

In FIG. 7, for instance, the peak value at the origin of the impulse contour or the conical contour is input (step S201), a sectional threshold value is calculated on the basis of the peak value at the origin (step S202), and for instance, as shown in FIGS. 13A and 13B, a sectional area (pixels in section) S which is obtained by slicing a point image distribution factor with a calculated sectional threshold value (step S203) Specifically, a sectional area S is calculated by counting pixels in a sectional part as shown in FIG. 13A. In an example shown in the same figure, the sectional area S is "52". Then, a point image radius R is calculated by effecting calculation of the following equation (4) based on the sectional area S calculated, whereby a point image radius R is obtained (step S204), and the point image radius R calculated is output (step S205). On one hand, a point image radius R is "4" in an example shown in FIG. 13B.

$$R = \sqrt{(S/\pi)} \tag{4}$$

where π: pi

Successively, the distance-direction calculating section 111 performs discrimination of a focusing direction and calculation of a focusing distance L after calculating point image radii R in every respective colors in FIG. 6 (step S109). In the following, a manner for discriminating a focusing direction and a manner for calculating a focusing distance will be specifically described by referring to FIG. 8. Explanation will be made on a case where a focusing position of a G color picture image is selected as a target focusing distance.

In the distance-direction calculating section 111, a direction of a focusing point is estimated by judging a relationship, in magnitude, of point image radii of respective R, G, and B picture images Rr:Rg:Rb, and further a distance up to a focusing point is estimated in response to a focal point direction.

More specifically, when input of a ratio of point image radii of the respective R, G, and B color picture images Rr:Rg:Rb, input of a diaphragm opening section Ro, and input of a distance of light receiving surface Lo are made (step S301), the relationship of the point image radii of the respective R, G, and B color picture images Rr:Rg:Rb in magnitude is judged (step S302). In case of Rr<Rg<Rb, the process shifts to step S303 to estimate that its situation is in forward focusing condition (step S303), and a focusing distance L (a distance up to a focusing point of the G color black and white image sensor 104B) is calculated on the basis of information of a diaphragm opening diameter Ro and a diaphragm surface-light receiving surface distance Lo as well as the point image radius Rg of G color picture image in accordance with the following equation (5). FIG. 14 is a diagram illustrating an example of a focusing distance L in case of forward focusing condition.

$$L = Lo \cdot Rg/(Ro+Rg) \tag{5}$$

Moreover, in step S302, if a case where Rr>Rg<Rb is valid, it shifts to step S304, so that the result of focusing is estimated and a focal length L=0 is estimated (step S307)

On one hand, in step S302, if a case where Rr>Rg>Rb is valid, it shifts to step S305, so that the result is estimated in a rearward focusing condition, and a focal length L is calculated on the basis of information of the diaphragm opening diameter Ro and the diaphragm surface-light receiving surface distance Lo as well as the point image radius Rg of G color picture image in accordance with the following equation (6). FIG. 15 is a diagram illustrating an example of a focusing distance L in case of rearward focusing condition.

$$L=Lo \cdot Rg/(Ro-Rg) \tag{6}$$

Then, the calculated focal length L is output (step S309). Succeedingly, the processing step shifts to step S110 in FIG. 6, and the focal point driving control device 112 judges whether or not a situation is in a focusing condition (whether a light receiving position of the G color black and white image sensor 104B did coincide with a focusing point of the focus lens 101 or not) based on the calculated focal length L. If it is not in a focusing condition, the focus lens 101 (or the color decomposing filter 103) is allowed to be rapidly moved to a focusing position (by a distance corresponding to the focal length L in a direction of the calculated focal position) (step S111), thereafter the processing step returns to the step S102, the AF processing is repeated once more for judging whether or not it reaches a real focusing position (focusing condition) to determine whether or not a situation is in the focusing condition, and the same AF processing (step S102 to step S111) is repeated until the focusing condition is achieved.

On the other hand, when it was judged in step S110 that a situation was in the focusing condition, the photographing/AF operation switching device 113 makes positions of the black and white image sensors 104A and 104C to shift to a position in case of normal photographing condition as shown in FIG. 9A (step S112), whereby a preparation for photographing an object is completed, and the processing step is in a waiting state of complete pushing down of shutter button. Thereafter, when the shutter button is completely pushed down, the shutter is opened for a certain period of time in response to action of the shutter button, whereby light ray from the object is received by the black and white image sensors 104A, 104B, and 104C. Then, picture image data are transferred from the black and white image sensors 104A, 104B, and 104C to the respective (R/G/B) frame picture image memories 114, and these data are saved or displayed on a monitor after they are subjected to picture image processing such as white balance (step S113).

With respect to the number of AF operation, in the case where a starting position for movement of the focus lens 101 (or the color decomposing filter 103) is in the vicinity of a focusing position, since focusing information is obtained from a picture image being substantially in focusing condition, its point image distribution factor exhibits a sharp peak as shown in FIG. 11, so that a situation reaches within an allowable range of focusing position by only one AF operation. On the contrary, since focus information is obtained from a defocused picture image in the case where a starting position for movement of the focus lens 101 (or the color decomposing filter 103) is in a position away from a focusing position, its point image distribution factor exhibits a gradual peak as shown in FIG. 12, so that a situation reaches within an allowable range of focusing position by a plurality of number of AF operations.

As described above, in a preferred embodiment of the present invention, an AF area has been established in a central part of imaging areas (imaging frames) of the black and white image sensors 104A, 104B, and 104C. In an imaging operation for AF condition, first, the black and white image sensors 104A, 104B, and 104C are disposed in such that light receiving distances for them differ from one another, correction for chromatic aberration is applied to the black and white image sensors 104A, 104B, and 104C by means of the focus lens 101, the respective (R, G, and B) color components decomposed by the color decomposing prism 103 are received respectively, a distance up to a focusing point and a direction along the same are estimated on the basis of defocusing characteristic information (point image distribution factor) in every respective colors of picture image data in respective AF areas, so that the focus lens 101 or the color decomposing prism 103 is moved in such that each light receiving position of the black and white image sensors 104A, 104B, and 104C coincides with a focusing point of the focus lens 101, then, the black and white image sensors 104A, 104B, and 104C are disposed at a position where the respective light receiving distances thereof come to be the same with each other, and normal photographing operation is carried out in this condition. Accordingly, information of a distance up to a focal position as well as a direction along the same can be obtained by only one image pick up operation for AF, so that it becomes possible to achieve rapid focusing operation. Furthermore, it becomes also possible to make focusing operation in accordance with movement of an object.

In a first embodiment of the present invention, since it is constituted in such that sizes of respective color point image radii are compared with each other, whereby focal point direction is discriminated, it involves such an advantage to be hardly affected by color components of an object in comparison with a manner for discriminating a focal point direction dependent upon magnitude of high frequency components in a filter system.

Furthermore, in the first embodiment of the present invention, as a manner for calculating point image distribution factor, adopted is a manner wherein picture image data in an AF area is multiplied by window function, then, converted by means of two-dimensional Fourier transform into an amplitude and a phase in frequency region, respective phases in the whole frequency region are replaced by zero, and thereafter subjected to two-dimensional inverse Fourier transform, whereby a point image distribution factor is obtained. Therefore, DFT (discrete Fourier transform) and FFT (fast Fourier transform) can be applied to the first embodiment, so that the first embodiment of the invention is suitable for digital integrated circuit such as DSP (Digital Signal Processor).

Moreover, in the first embodiment, the distance-direction calculating section 111 has been arranged in such that a sectional area is calculated on the basis of a threshold value calculated based on a peak value of its origin of point image distribution factor, and a point image radius is obtained with respect to the sectional area. Accordingly, even in a case where a point image section does not take a circular form, but a polygonal form as in an actual diaphragm opening of a camera, a point image radius in the case where it takes approximate circular form can be determined, so that it becomes possible to calculate simply a point image radius in high precision.

It is to be noted that the present invention is not limited to the above described preferred embodiment, but it may be suitably modified within a scope of the invention wherein no subject matter of the invention is changed.

While a digital still camera has been illustrated and explained in the above described embodiment, the present invention is also applicable to digital video camera since information of a distance up to a focusing position and a direction along the same can be obtained in principle at an arbitrary position of a focus lens by only one image pick up operation, so that it is applicable for a tracking servo.

Moreover, in the above described embodiment, digital signal processing has been applied in accordance with two-dimensional discrete Fourier transform (DFT) or fast Fourier transform (FFT) for determining a point image distribution factor in focal point control. These operations may be made by either utilizing excessive ability of a processor for camera controller, or disposing an arithmetic circuit in an integrated circuit such as IPP (Image Pre Processor). In addition, it may be arranged with respect to window function in such that a part of w (u, v) has been stored as a table for omitting calculation, and only a factor multiplication is performed.

According to the invention in the first aspect, an automatically focusing system provided with imaging devices of a multiple plate type is constituted in such that object light ray is subjected to chromatic aberration correction by means of a lens system to image the resulting light ray; the object light ray through the lens system is separated by means of a color decomposing means into respective color components; an AF area is established in a central part of an imaging area in each of the plurality of imaging devices and which is served for receiving the color component to convert the same into picture image data; a focusing position estimating means calculates defocusing characteristic information of the picture image data in the respective AF areas of the plurality of imaging devices which have been disposed in such that light receiving distances differ from one another in every respective colors to estimate a distance up to a focusing point as well as a direction along the same on the basis of the defocusing characteristic information of the calculated respective colors; a focusing condition discriminating means judges whether or not a situation is in a focusing condition based on the distance up to the focusing point estimated; and a driving means shifts the lens system or the color decomposing means by the distance up to the focusing point along the direction in the focusing point estimated in the case when it was judged that a situation was not in a focusing condition. Accordingly, in imaging devices of a multiple plate type, information of a distance up to a focusing position as well as a direction along the same can be obtained by only one imaging operation for AF, so that it becomes possible to rapidly achieve pertinent focusing condition. In addition, it becomes also possible to attain focusing operation in accordance with a movement of an object.

Moreover, according to the invention in the second aspect, an automatically focusing system provided with imaging devices of a multiple plate type is constituted in such that object light ray is subjected to chromatic aberration correction by means of a lens system to image the resulting light ray; the object light ray through the lens system is separated by means of a color decomposing means into respective color components; an AF area is established in a central part of an imaging area in each of the plurality of imaging devices and which is served for receiving the color component to convert the same into picture image data; an imaging device shifting means shifts a plurality of imaging devices; a focusing position estimating means calculates defocusing characteristic information of the picture image data in the respective AF areas of the plurality of imaging devices which have been shifted by the imaging device shifting means in such that light receiving distances differ from one another in every respective colors, and calculates point image radii in the respective colors on the basis of point image distribution factors of the respective colors calculated to estimate a distance up to a focusing point as well as a direction along the same based on the point image radii of the calculated respective colors; a focusing condition discriminating means judges whether or not a situation is in a focusing condition based on the distance up to the focusing point estimated by the focusing position estimating means; and a driving means shifts the lens system or the color decomposing means by the distance up to the focusing point along the direction in the focusing point estimated by the focusing position estimating means in the case when it was judged that a situation was not in a focusing condition by means of the focusing condition discriminating means. Accordingly, in imaging devices of a multiple plate type, information of a distance up to a focusing position as well as a direction along the same can be obtained by only one imaging operation for AF, so that it becomes possible to rapidly achieve pertinent focusing condition. In addition, it becomes also possible to attain focusing operation in accordance with a movement of an object. Besides, since it is constituted in such that a focusing direction is discriminated on the basis of a magnitude of point image radii in the respective colors, there is such an advantage in that it is hardly affected by color components of an object in comparison with a method for discriminating a focusing direction in accordance with a magnitude of high frequency component in a filter type.

Furthermore, according to the invention in the third aspect, an automatically focusing system in the first or second aspect is constituted in such that the focusing position estimating means multiplies the picture image data in the AF area by window function, then subjects the result to two-dimensional Fourier transform to transform the result into an amplitude and a phase in a frequency region thereby to replace respective phases in the whole frequency region with zero, and thereafter subjects the result to two-dimensional inverse Fourier transform to calculate the point image distribution factor. Accordingly, there is such an advantage in that it is hardly affected by color components of an object in comparison with a method for discriminating a focusing direction in accordance with a magnitude of high frequency component in a filter type.

Moreover, according to the invention in the fourth aspect, an automatically focusing system in the second or third aspect is constituted in such that the focusing position estimating means calculates a sectional area based on a threshold value calculated on the basis of a peak value of its origin of the point image distribution factor, and the point image radius is calculated on the basis of the calculated sectional area. Accordingly, even if a case where a point image section does not form a circle, but a polygon as in an actual diaphragm opening of a camera, a point image radius in case of circular approximation can be determined, and hence, it becomes possible to calculate simply such point image radius with high precision.

Furthermore, according to the invention in the fifth aspect, a focusing method for an automatically focusing system is constituted in such that a plurality of imaging devices are disposed in such that respective light receiving distances differ from one another; object light ray is subjected to chromatic aberration correction by means of a lens system to image the resulting light ray; the object light ray through the lens system is separated into respective color components; a distance up to a focusing point as well as a direction along the same are estimated on the basis of point image distribution radii in respective colors calculated wherein light rays in respective color components are received by the plurality of imaging devices, point image distribution factors indicating defocusing characteristics in every respective colors of the picture image data in the respective AF areas are calculated respectively, and the point image radii of the respective colors are calculated on the basis of the calculated point image distribution factors in the respective colors; it is judged whether or not a situation is in a focusing condition based on the estimated distance up to the focusing point; the lens system or the color decomposing means is shifted by the distance up to the focusing point along the direction in the focusing point estimated in the case when it was judged that a situation was not in a focusing condition; while normal photographing operation is performed after shifting the plurality of imaging devices to positions wherein the respective distances for receiving light rays are identical with each other in the case when it was judged that a situation was in a focusing condition. Thus, in imaging devices of a multiple plate type, information of a distance up to a focusing position as well as a direction along the same can be obtained by only one imaging operation for AF, so that it becomes possible to rapidly achieve pertinent focusing condition. In addition, it becomes also possible to attain focusing operation in accordance with a movement of an object. Besides, since it is constituted in such that a focusing direction is discriminated on the basis of a magnitude of point image radii in the respective colors, there is such an advantage in that it is hardly affected by color components of an object in comparison with a method for discriminating a focusing direction in accordance with a magnitude of high frequency component in a filter type.

Moreover, according to the invention in the sixth aspect, a focusing method for an automatically focusing system in the fifth aspect is constituted in such that the picture image data in the AF area is multiplied by window function, then the result is subjected to two-dimensional Fourier transform to transform into an amplitude and a phase in a frequency region, the respective phases in the whole frequency region are replaced by zero, and thereafter, the result is subjected to two-dimensional inverse Fourier transform to calculate the point image distribution factor. Hence, there is such an advantage in that it is hardly affected by color components of an object in comparison with a method for discriminating a focusing direction in accordance with a magnitude of high frequency component in a filter type.

Furthermore, according to the invention in the seventh aspect, a focusing method for an automatically focusing system in the fifth or sixth aspect is constituted in such that a sectional area is calculated on the basis of a threshold value calculated based on a peak value in its origin of the point image distribution factor, and the point image radii are calculated on the basis of the calculated sectional area. Therefore, even if a case where a point image section does not form a circle, but a polygon as in an actual diaphragm opening of a camera, a point image radius in case of circular approximation can be determined, and hence, it becomes possible to calculate simply such point image radius with high precision.

The present document incorporates by reference the entire contents of Japanese priority document, 11-233202 filed in Japan on Aug. 19, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An automatically focusing system provided with imaging devices of a multiple plate type, comprising:

a lens system which subjects object light ray to chromatic aberration correction to image the resulting light ray;

a color decomposing unit which separates the object light ray through said lens system into respective color components;

a plurality of imaging devices in each of which an AF area is established in a central part of an imaging area and which is served for receiving said color component to convert the same into picture image data;

a focusing position estimating unit which calculates defocusing characteristic information of the picture image data in the respective AF areas of said plurality of imaging devices which have been disposed in such that light receiving distances differ from one another in every respective colors to estimate a distance up to a focusing point as well as a direction along the same on the basis of the defocusing characteristic information of the calculated respective colors;

a focusing condition discriminating unit which judges whether or not a situation is in a focusing condition based on said distance up to the focusing point estimated by said focusing position estimating unit; and a driving unit which shifts said lens system or said color decomposing unit by said distance up to the focusing point along said direction in said focusing point estimated by said focusing position estimating unit in the case when it was judged that a situation was not in a focusing condition by means of said focusing condition discriminating unit.

2. An automatically focusing system according to claim 1, wherein said focusing position estimating unit multiplies said picture image data in the AF area by window function, then subjects the result to two-dimensional Fourier transform to transform the result into an amplitude and a phase in a frequency region thereby to replace respective phases in the whole frequency region with zero, and thereafter subjects the result to two-dimensional inverse Fourier transform to calculate a point image distribution factor.

3. An automatically focusing system according to claim 2, wherein said focusing position estimating unit calculates a sectional area based on a threshold value calculated on the basis of a peak value of its origin of said point image distribution factor, and a point image radius is calculated on the basis of the calculated sectional area.

4. An automatically focusing system provided with imaging devices of a multiple plate type, comprising:

a lens system which subjects object light ray to chromatic aberration correction to image the resulting light ray;

a color decomposing unit which separates the object light ray through said lens system into respective color components;

a plurality of imaging devices in each of which an AF area is established in a central part of an imaging area and which is served for receiving said color component to convert the same into picture image data;

an imaging device shifting unit which shifts said imaging devices;

a focusing position estimating unit which calculates defocusing characteristic information of the picture image data in the respective AF areas of said plurality of imaging devices which have been shifted by said imaging device shifting unit in such that light receiving distances differ from one another in every respective colors and calculating point image radii in the respective colors on the basis of point image distribution factors of the respective colors calculated to estimate a distance up to a focusing point as well as a direction along the same based on the point image radii of the calculated respective colors;

a focusing condition discriminating unit which judges whether or not a situation is in a focusing condition based on said distance up to the focusing point estimated by said focusing position estimating unit; and a driving unit which shifts said lens system or said color decomposing unit by said distance up to the focusing point along said direction in said focusing point estimated by said focusing position estimating unit in the case when it was judged that a situation was not in a focusing condition by means of said focusing condition discriminating unit.

5. An automatically focusing system according to claim 4, wherein said focusing position estimating unit multiplies said picture image data in the AF area by window function, then subjects the result to two-dimensional Fourier transform to transform the result into an amplitude and a phase in a frequency region thereby to replace respective phases in the whole frequency region with zero, and thereafter subjects the result to two-dimensional inverse Fourier transform to calculate a point image distribution factor.

6. An automatically focusing system according to claim 4, wherein said focusing position estimating unit calculates a sectional area based on a threshold value calculated on the basis of a peak value of its origin of said point image distribution factor, and a point image radius is calculated on the basis of the calculated sectional area.

7. A focusing method for an automatically focusing system, comprising:

a first step for disposing a plurality of imaging devices each having a respective AF area, in such that respective light receiving distances differ from one another;

a second step for subjecting object light ray to chromatic aberration correction by means of a lens system to image the resulting light ray;

a third step for separating the object light ray through the lens system into respective color components by a color decomposing unit;

a fourth step for estimating a distance up to a focusing point as well as a direction along the same on the basis of point image distribution radii in respective colors calculated wherein light rays in respective color components are received by said plurality of imaging devices, point image distribution factors indicating defocusing characteristics in every respective colors of the picture image data in the respective AF areas are calculated respectively, and the point image radii of the respective colors are calculated on the basis of the calculated point image distribution factors in the respective colors;

a fifth step for judging whether or not a situation is in a focusing condition based on said estimated distance up to said focusing point;

a sixth step for shifting said lens system or said color decomposing unit by said distance up to the focusing point along said direction in said focusing point estimated in the case when it was judged that a situation was not in a focusing condition in said fifth step;

a seventh step for repeating said second step through said fifth step after shifting said lens system or said color decomposing unit by said distance up to the focusing point along said direction in said focusing point estimated; and an eighth step for performing normal photographing operation after shifting said plurality of imaging devices to positions wherein the respective distances for receiving light rays are identical with each other in the case when it was judged that a situation was in a focusing condition in said fifth step.

8. A focusing method for an automatically focusing system according to claim 7, wherein in said fourth step, said picture image data in the AF area is multiplied by window function, then the result is subjected to two-dimensional Fourier transform to transform into an amplitude and a phase in a frequency region, the respective phases in the whole frequency region are replaced by zero, and thereafter, the result is subjected to two-dimensional inverse Fourier transform to calculate said point image distribution factor.

9. A focusing method for an automatically focusing system according to claim 7, wherein in said fourth step, a sectional area is calculated on the basis of a threshold value calculated based on a peak value in its origin of said point image distribution factor, and said point image radii are calculated on the basis of the calculated sectional area.

* * * * *